US010951473B1

(12) United States Patent
Jaisinghani et al.

(10) Patent No.: US 10,951,473 B1
(45) Date of Patent: Mar. 16, 2021

(54) ASYNCHRONOUS FLEET CONFIGURATION SERVICE

(71) Applicant: Amazon Technologies, Inc., Seattle, WA (US)

(72) Inventors: Avinash Jaisinghani, Seattle, WA (US); Prashant Jayaraman, Bothell, WA (US); Christopher Whitaker, Sammamish, WA (US); Matthew John Hinkle, Seattle, WA (US); Pete Peerapong Janes, Seattle, WA (US); Adam M. Thomas, Seattle, WA (US); Jaykumar Harish Gosar, Bothell, WA (US); Chetan Manohar Dandekar, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 747 days.

(21) Appl. No.: 14/668,303

(22) Filed: Mar. 25, 2015

(51) Int. Cl.
*G06F 9/455* (2018.01)
*H04L 12/24* (2006.01)

(52) U.S. Cl.
CPC ............... *H04L 41/0816* (2013.01)

(58) Field of Classification Search
CPC .......... G06F 8/36; G06F 9/44505; G06F 8/60; H04L 41/0816
USPC ......................................................... 709/221
See application file for complete search history.

(56) References Cited

U.S. PATENT DOCUMENTS

| 8,260,893 | B1* | 9/2012 | Bandhole ............... G06F 9/5083 709/221 |
| 8,332,688 | B1* | 12/2012 | Tompkins ........... G06F 11/1438 714/13 |
| 8,335,851 | B1* | 12/2012 | Vendrow ................... G06F 8/60 700/99 |
| 8,359,594 | B1* | 1/2013 | Davidson .............. G06F 9/5077 709/218 |
| 8,607,067 | B1* | 12/2013 | Janse van Rensburg .................... H04L 63/0823 713/189 |
| 9,124,633 | B1* | 9/2015 | Eizadi ..................... H04L 61/20 |
| 9,300,759 | B1* | 3/2016 | Jorgensen ............... G06F 9/541 |
| 9,336,020 | B1* | 5/2016 | Oweis ................. G06F 9/44505 |
| 10,089,152 | B1* | 10/2018 | Kramer ................... G06F 9/445 |
| 2007/0156659 | A1* | 7/2007 | Lim ..................... G06F 21/6227 |
| 2009/0100420 | A1* | 4/2009 | Sapuntzakis ............. G06F 8/65 717/171 |
| 2010/0058328 | A1* | 3/2010 | DeHaan .................... G06F 8/61 717/176 |
| 2010/0146503 | A1* | 6/2010 | Tsai ...................... G06F 9/4881 718/1 |
| 2011/0126197 | A1* | 5/2011 | Larsen .................. H04L 9/3213 718/1 |

(Continued)

*Primary Examiner* — Tonia L Dollinger
*Assistant Examiner* — Schquita D Goodwin
(74) *Attorney, Agent, or Firm* — Lee & Hayes, P.C.

(57) ABSTRACT

Technologies are disclosed herein for providing an asynchronous fleet configuration service for deploying and updating a fleet of network resources. The asynchronous fleet configuration service exposes an asynchronous application programming interface (API) that allows for individual resources to indicate an initialization status. Accordingly, the asynchronous fleet configuration service can asynchronously monitor the status of individual resources being deployed or updated, while performing other duties related to the fleet of network resources.

20 Claims, 8 Drawing Sheets

(56) References Cited

U.S. PATENT DOCUMENTS

| | | | |
|---|---|---|---|
| 2012/0072909 A1* | 3/2012 | Malik | H04L 12/4641 718/1 |
| 2012/0144038 A1* | 6/2012 | Hildebrand | H04L 41/0806 709/226 |
| 2012/0233668 A1* | 9/2012 | Leafe | G06F 9/00 726/4 |
| 2012/0304169 A1* | 11/2012 | Anderson | G06F 9/5077 718/1 |
| 2013/0103835 A1* | 4/2013 | Yotsutani | G06F 9/4887 709/225 |
| 2013/0111468 A1* | 5/2013 | Davis | G06F 9/5077 718/1 |
| 2013/0219385 A1* | 8/2013 | Geibel | G06F 9/5088 718/1 |
| 2013/0232498 A1* | 9/2013 | Mangtani | G06F 9/5072 718/104 |
| 2013/0247035 A1* | 9/2013 | Khanna | G06F 11/1482 718/1 |
| 2013/0263131 A1* | 10/2013 | Beda, III | G06F 8/63 718/1 |
| 2013/0297964 A1* | 11/2013 | Hegdal | G06F 11/0712 714/2 |
| 2014/0115579 A1* | 4/2014 | Kong | G06F 3/0605 718/1 |
| 2014/0137261 A1* | 5/2014 | Chen | G06F 21/105 726/26 |
| 2014/0189677 A1* | 7/2014 | Curzi | G06F 8/65 717/171 |
| 2014/0237464 A1* | 8/2014 | Waterman | G06F 8/65 717/172 |
| 2014/0280966 A1* | 9/2014 | Sapuram | H04L 41/5054 709/226 |
| 2014/0310810 A1* | 10/2014 | Brueckner | H04L 63/1441 726/23 |
| 2014/0344810 A1* | 11/2014 | Wang | G06F 9/455 718/1 |
| 2015/0081910 A1* | 3/2015 | Assuncao | G06F 9/5055 709/226 |
| 2015/0135160 A1* | 5/2015 | Gauvin | G06F 8/71 717/109 |
| 2015/0222604 A1* | 8/2015 | Ylonen | H04L 63/10 713/171 |
| 2015/0358392 A1* | 12/2015 | Ramalingam | H04L 41/0273 709/203 |

* cited by examiner

US 10,951,473 B1

ASYNCHRONOUS FLEET CONFIGURATION SERVICE

BACKGROUND

Distributed computing networks may provide a number of services that can be configured to provide different types of functionality. For example, a service provider network deploying a distributed computing network for use by customers may offer a number of different services. Distributed computing networks may also be utilized to operate fleets of network resources that are configured to provide different types of functionality. For example, a fleet of network resources may be configured to execute a Web server application in order to receive and respond to requests for Web pages or other types of data. Other types of applications and/or services might also be executed on the network resources in such a fleet, including additional services offered by the service provider.

Operation of a fleet of network resources can be a complicated, expensive and time consuming process. For example, the operator of a network service executing on a fleet of network resources may be responsible for arranging to deploy or update configurations to one or more network resources. The deploy or update process may require one or more dependencies between network resources.

Accordingly, if a particular network resource has not deployed or has not been initiated to a functioning level, one or more errors can occur that may limit overall functionality of the fleet. Conventional solutions to reducing dependency errors are limited to invoking time delays between deployment of subsequent resources. The time delays can further complicate the deploy or update process, and may unnecessarily delay the entire deploy or update process if one or more of the network resources is fully functional prior to lapse of the time delay.

The disclosure made herein is presented with respect to these and other considerations.

DETAILED DESCRIPTION

Figure 1:
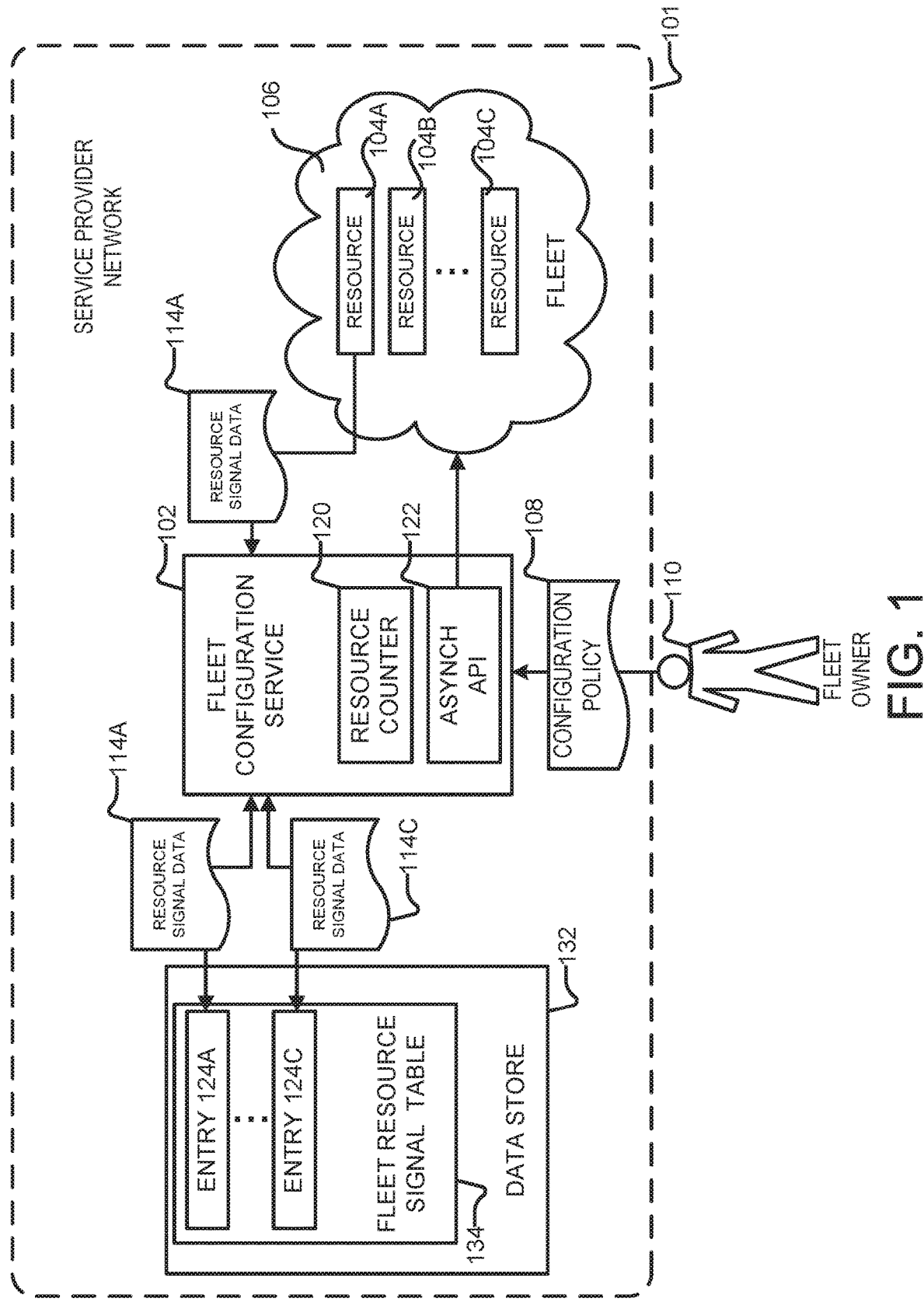
FIG. 1 is a system architecture diagram showing aspects of the configuration and operation of a fleet configuration service in one configuration presented herein.

The following detailed description is directed to technologies for providing an asynchronous fleet configuration service. Utilizing the technologies described herein, an asynchronous fleet configuration service can be implemented that provides functionality for deploying or updating a fleet of network resources through a service provider network.

The fleet configuration service may be configured to receive new or updated configuration policies from a fleet owner. The configuration policies may describe a launch configuration, a creation policy, an update policy, and other provisions. The launch configuration may describe particular launch parameters for the fleet of network resources, including, for example, whether the fleet of network resources can be automatically scaled depending upon processing loads. The creation policy may describe particular creation parameters for the fleet of network resources, including an indication of whether asynchronous fleet configuration is supported during creation. The update policy may describe particular update parameters for the fleet of network resources, including an indication of whether asynchronous fleet configuration is supported during updates to the fleet of network resources.

The configuration policies may be standalone policies submitted by a fleet owner, or may be included as a portion of a computing architecture configuration template. Generally, computing architecture configuration templates are data files describing one or more network resources or services provided by the service provider network. For example, the data files can include a description of resources, and any associated dependencies or runtime parameters, required to run the services or applications. The computing architecture templates can provide for relatively easy provisioning and updating of resources, services, applications, and other attributes of a computing architecture. Accordingly, if configuration policies are included in a computing architecture configuration template, the launch configuration, creation policy, and update policy may be included in the description of resources.

Upon receipt of the configuration policy, or a computing architecture configuration template including a configuration policy, the asynchronous fleet configuration service may make a determination as to whether any deployed resources need to be updated, or whether any other changes to a fleet of network resources are necessary or desired. If changes are necessary, the asynchronous fleet configuration service may cycle down existing network resources of the fleet, and cycle in new resources configured as described in the configuration policy.

The cycling down of existing network resources may include selectively terminating resources conforming to an old or outdated configuration. The cycling of new resources may include initializing resources to deploy an updated fleet of resources conforming to the new configuration. The initializing of the resources may be done in batches. Furthermore, initializing of individual resources in the batches may include asynchronous updates to the status of each individual resource to the asynchronous fleet configuration service.

The fleet configuration service may expose an asynchronous network service application programming interface (API) describing an asynchronous signaling protocol that resources may access. Through the asynchronous API, resources can submit resource signal data identifying the resource and associated attributes, to the fleet configuration service for validation. Upon validation, the fleet configuration service may store the resource signal data as entries in a fleet resource signal table or other data construct. Upon storage, the fleet configuration service may continue to initialize resources in any suitable manner, while only polling the fleet resource table in an asynchronous manner. Accordingly, the fleet configuration service can receive asynchronous updates as to the status of each network resource.

Upon retrieving enough valid resource signal data from the fleet resource signal table indicating that a suitable number of resources of a particular batch of resources are operational, the fleet configuration service can proceed to cycle new batches of resources until an entire fleet of resources is appropriately updated. Thus, the fleet configuration service can asynchronously monitor the fleet resource signal table while performing other duties related to fleet configuration, and proceed to initialize batches of resources while not being dependent upon an arbitrary time delay that may not adequately indicate the status of individual resources.

It should be appreciated that the functionality provided by the asynchronous fleet configuration service might also be partially supplemented by interactions with a customer and/or administrative user of the service provider network. For example, and without limitation, the failure of a batch of resources may trigger intervention to roll-back or re-initialize resources conforming to the old configuration while appropriate changes are made to the new configuration. Other functionality may also be provided. Additional details regarding the various components and processes described above for implementing an asynchronous fleet configuration service will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of an asynchronous fleet configuration service 102 in one configuration presented herein. As shown in FIG. 1, and described briefly above, the asynchronous fleet configuration service 102 might operate within or in conjunction with a service provider network 101. The asynchronous fleet configuration service 102 provides functionality from which customers can configure and utilize computing resources 104A, 104B, 104C, (which may be referred to herein as "resources 104" or "resource 104"), such as virtual machine instances and/or other types of computing resources, deployed as a fleet 106, from a service provider. The resources 104 can be instantiated based on a configuration policy 108 in some implementations. The configuration policy 108 may describe a launch configuration, a creation policy, an update policy, and other provisions for the fleet 106 of resources 104.

The configuration policy 108 may be a standalone policy submitted by a fleet owner 110, or may be included as a portion of a computing architecture configuration template. Generally, computing architecture configuration templates are data files as described above, and can include a description of resources 104, and any associated dependencies or runtime parameters, required to run services or applications through the fleet 106.

Each type or configuration of a resource 104 described in the configuration policy 108 may be available from the service provider network 101 in different sizes. For example, a service provider might offer virtual machine instances or other types of data processing resources that are available for purchase and use that have many different configurations of processor capabilities, main memory, disk storage, and operating system. A service provider might also offer other types of resources for purchase and use by customers. For example, a service provider might offer hardware devices, database resources, file or block data storage resources, and/or networking resources, such as load balancing resources, DNS resources, virtual private cloud (VPC) resources, virtual local area network (VLAN) resources, and/or other types of hardware and software computing resources on a permanent or as-needed basis.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks (WANs), such as the Internet. In the environment shown in FIG. 1, a service provider might operate one or more data centers configured to provide the resources in the service provider network 101 to its customers and fleet owners.

The resources described briefly above might also be provisioned and de-provisioned as needed in an automated fashion. For example, the service provider network 101 might instantiate a new instance of a computing resource, such as a virtual machine instance, in response to an increase in demand for a service. Other types of computing resources might also be provisioned and de-provisioned in a similar manner. The service provider network might also provide functionality for automatically scaling and/or de-scaling resources based upon demand for the resources or other factors. Scaling of resources and automatic provisioning and de-provisioning of resources may also be described within the configuration policy 108.

The service provider network 101 may also be configured to provide various network services for use by the fleet owner 110. For example, and without limitation, the service provider network 101 may provide a virtual computer system service, a block-level data storage service, a cryptography service, an on-demand data storage service, a notification service, an authentication service, a policy management service, a task service and, potentially, other services. These and other services may be utilized together to implement various types of network-based applications that are instantiated through an appropriate processing of configuration policy 108. Additional details regarding one implementation of the service provider network 101 and the various types of network services that might be provided will be provided below with regard to FIGS. 5-8.

As discussed briefly above, an asynchronous fleet configuration service 102 is disclosed herein that operates within or in conjunction with the service provider network 101. The asynchronous fleet configuration service 102 is a network service that provides functionality for deploying and updating the fleet 106 of resources 104 in the service provider network 101.

The asynchronous fleet configuration service 102 is configured to receive the configuration policy 108, and deploy or update resources 104 based on the configuration policy 108. In at least one implementation, the configuration policy 108 is a stand-alone data file describing the resources 104 and appropriate attributes associated with creating and updating the resources 104. According to another implementation, the configuration policy 108 is described within a computing architecture configuration template as described above.

Upon receipt of the configuration policy 108, the asynchronous fleet configuration service 102 may make a determination as to whether any deployed resources 104 of the fleet 106 need to be updated, or whether any other changes to a fleet of network resources are necessary or desired. If changes are necessary, the asynchronous fleet configuration service 102 may cycle down existing network resources 104 of the fleet 106, and cycle in new resources configured as described in the configuration policy 108.

The cycling down of existing network resources may include selectively terminating resources conforming to an old or outdated configuration. The old or outdated configuration, for example, may be an earlier version of the configuration policy 108 in some implementations.

The cycling of new resources may include initializing resources to deploy an updated fleet 106 of resources 104 conforming to the new configuration described in the configuration policy 108. The initializing of the resources may be done in batches. Furthermore, initializing of individual resources in the batches may include asynchronous updates to the status of each individual resource to the asynchronous fleet configuration service 102.

The fleet configuration service 102 may expose an asynchronous API 122 to the fleet 106 that describes an asynchronous signaling protocol that the resources 104 may access. According to one implementation, a helper script may be employed by individual resources 104 such that the resources can submit resource signal data 114, such as data 114A from resource 104A in FIG. 1, identifying the resource and associated attributes, to the fleet configuration service 102 for validation.

Upon validation, the fleet configuration service 102 may store the resource signal data 114 as entries 124 in a fleet resource signal table 134, database, or other data construct stored through a data store 132, such as resource signal data 114A and 114C stored as corresponding entries 124A and 124C in FIG. 1. Upon storage, the fleet configuration service 102 may continue to initialize resources 104 in any suitable manner, while only polling the fleet resource signal table 134 in an asynchronous manner.

Upon retrieving a threshold number of valid resource signal data 114 from the fleet resource signal table 134 indicating that a suitable number of resources 104 of a particular batch of resources are operational or updated, the fleet configuration service 102 can proceed to cycle new batches of resources until an entire fleet 106 of resources is appropriately updated or deployed. Thus, the fleet configuration service can asynchronously monitor the fleet resource signal table while performing other duties related to fleet configuration, and proceed to initialize batches of resources while not being dependent upon a time delay that may not adequately indicate the status of individual resources.

Hereinafter, operation of the various services and technologies described above, including the configuration policy 108 and the asynchronous fleet configuration service 102, are described in detail with reference to FIGS. 2-4.

Figure 2:
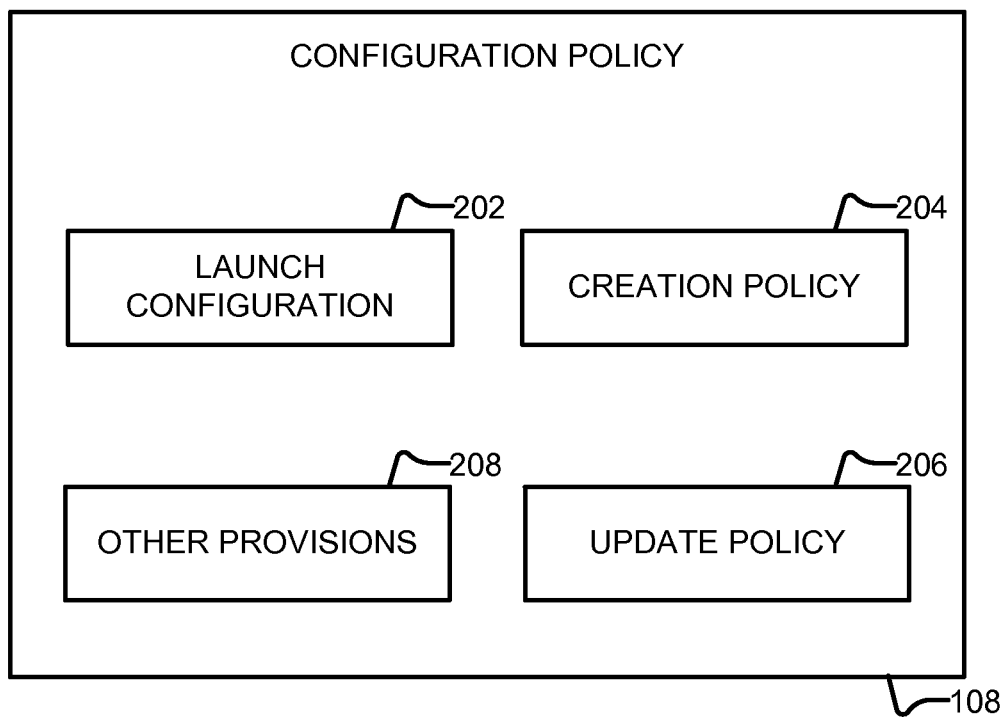
FIG. 2 is a schematic illustrating aspects of a configuration policy for processing by a fleet configuration service in one configuration described herein.

FIG. 2 is a schematic illustrating aspects of the configuration policy 108 for processing by the asynchronous fleet configuration service 102 in one configuration described herein. As illustrated, the configuration policy 108 includes a launch configuration 202, a creation policy 204, and an update policy 206. The configuration policy 108 may also include other provisions 208 in some implementations.

The launch configuration 202 may describe particular launch parameters for the fleet 106 of network resources 104. For example, the launch configuration 202 may describe whether the fleet 106 of network resources 104 can be automatically scaled depending upon processing loads. The launch configuration 202 can also describe particular provisioning and de-provisioning attributes as well as automatic scaling. For example, the launch configuration 202 can describe an identifier for a fleet 106 or a desired operating region for the fleet 106.

The creation policy 204 may describe particular creation parameters for the fleet 106 of network resources 104. For example, the creation policy 204 may describe an indication of whether asynchronous fleet configuration is supported during creation. As used herein, asynchronous fleet configuration is a configuration that supports asynchronous signaling of a status and identification information for a particular resource. If asynchronous fleet configuration is supported, the associated resource may invoke a helper script, as described above, to provide resource signal data 114 to the asynchronous fleet configuration service 102 during creation or deploying of resources.

The update policy 206 may describe particular update parameters for the fleet 106 of network resources 104. For example, the update policy 206 may include an indication of whether asynchronous fleet configuration is supported during updates to the fleet 106 of network resources 104. Accordingly, if asynchronous fleet configuration is supported, associated resources may invoke the helper script to provide resource signal data 114 to the asynchronous fleet configuration service 102 during an update of resources. The update policy 206 may also describe other attributes related to updating of resources, including whether a rolling update to a new configuration is supported, or whether rolling-back to a previous configuration is supported, as well.

Utilizing the information described in the configuration policy 108, the asynchronous fleet configuration service 102 can deploy or update the fleet 106 of resources 104 in a manner dictated by the information contained in the configuration policy. Hereinafter, use of the configuration policy 108 by the asynchronous fleet configuration service 102 to deploy or update the fleet 106 of resources 104 is described in detail with reference to FIGS. 3-4.

Figure 3:
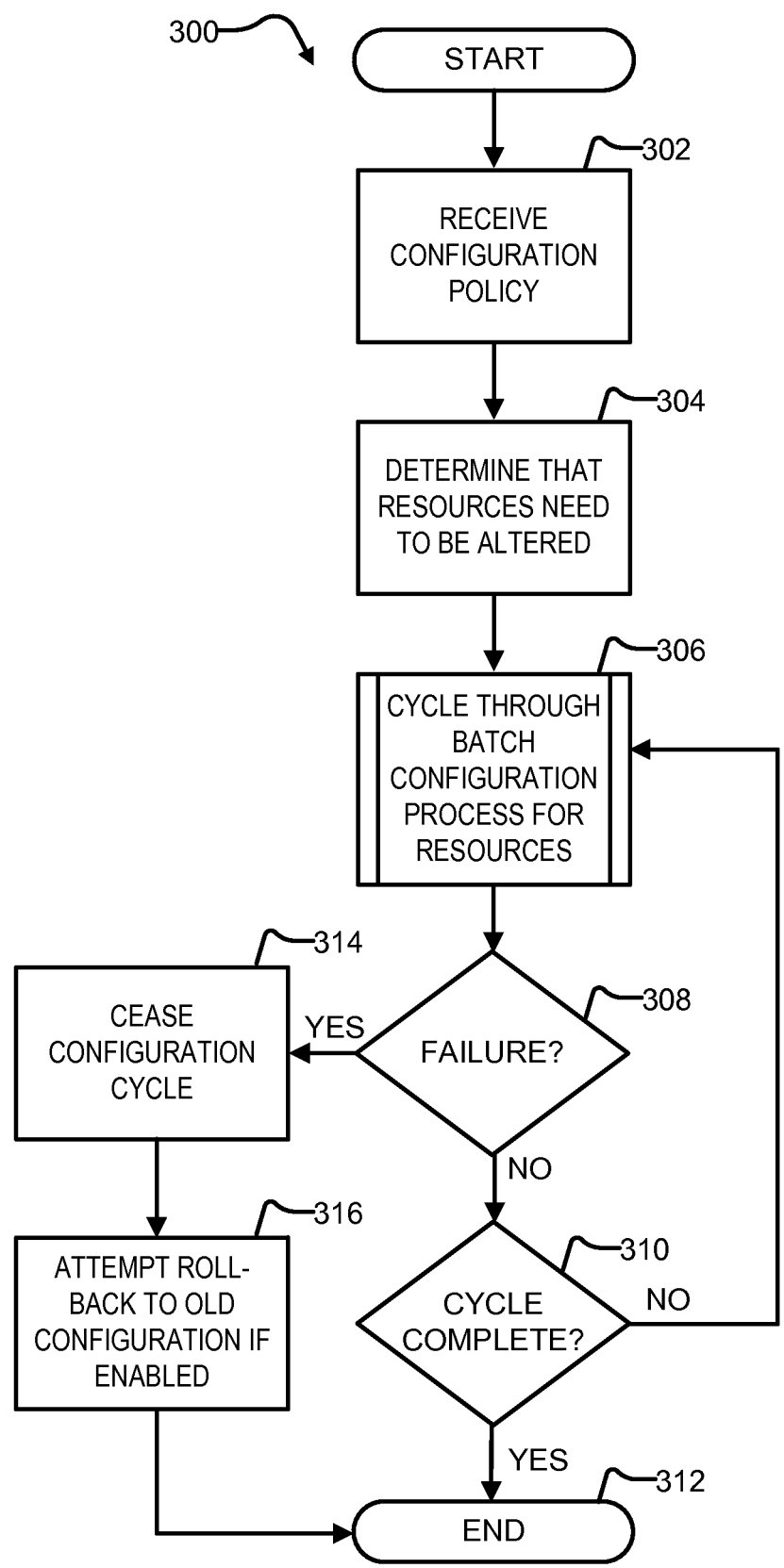
FIG. 3 is a flow diagram illustrating aspects of the operation of a fleet configuration service in one configuration disclosed herein.

FIG. 3 is a flow diagram of a method 300 illustrating aspects of the operation of the fleet configuration service 102 in one configuration disclosed herein. The method 300 includes receiving a configuration policy 108, at block 302. For example, the asynchronous fleet configuration service 102 may receive the configuration policy 108 from fleet owner 110.

Upon receipt of the configuration policy 108, the asynchronous fleet configuration service 102 can determine whether resources 104 need to be altered, whether new resources need to be deployed, or any other changes necessary to the fleet 106, at block 304. Necessary changes can include any changes necessary to ensure the resources 104 of the fleet 106 conform to the configuration described by the configuration policy 108. Example changes include updates to software or firmware, updates to available processing resources or communication resources, provisioning or de-provisioning of additional resources, automatic scaling due to processing loads, or other suitable changes.

Upon determination that changes are necessary based on the configuration policy 108, the asynchronous fleet configuration service 102 may cycle through batch asynchronous configuration process 306 for the resource 104 of the fleet 106. The batch asynchronous configuration process 306 is described more fully below with reference to FIG. 4.

Upon appropriate processing of a batch of updates, deployments, or other changes to a batch of resources of the fleet 106, the asynchronous fleet configuration service 102 may determine whether there was a failure in one or more resources of the batch, at block 308. If no failures occurred, or if all resources are suitably initiated, the asynchronous fleet configuration service 102 may determine if the entire cycle of batches has been completed, at block 310. If additional batches of resources 104 need to be processed, the asynchronous fleet configuration service 102 may iterate through blocks 306, 308, and 310 until all batches have been suitably processed, and the method 300 may cease at block 310.

Turning back to block 308, if failures have occurred, the asynchronous fleet configuration service 102 may cease the configuration cycle at block 314, and attempt to roll-back to an old configuration if enabled by the configuration policy 108, at block 316. Thereafter, the method 300 may cease at block 312. It is noted that roll-back and other similar policy attributes may be defined within the configuration policy 108, in one or both of the creation policy 204 or update policy 206.

Figure 4:
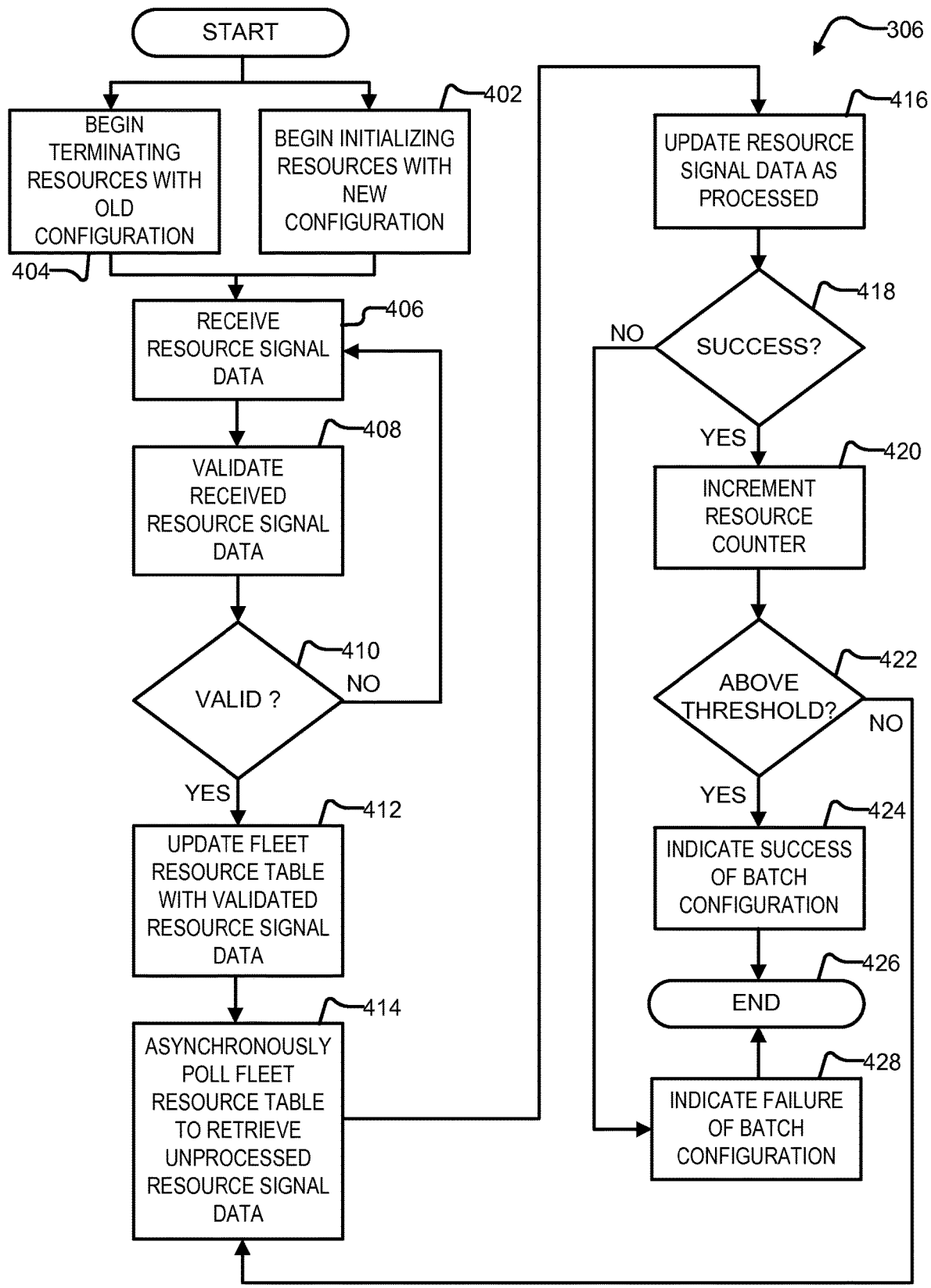
FIG. 4 is a flow diagram illustrating aspects of the operation of a fleet configuration service in one configuration disclosed herein.

FIG. 4 is a flow diagram of the asynchronous batch configuration method 306 illustrating aspects of the operation of the fleet configuration service 102 in one configuration disclosed herein. As shown in FIG. 4, upon initiation of an asynchronous batch configuration for a batch of resources 104, the asynchronous fleet configuration service 102 may begin terminating resources adhering to an old configuration at block 404 and initializing resources with a new configuration described in the configuration policy 108, at block 402. It is noted that block 404 may be omitted if deploying an initial batch of resources with a new configuration policy 108.

As new resources are initiated, the asynchronous fleet configuration service 102 may receive resource signal data 114 from resources 104, at block 406. Generally, the resource signal data 114 includes at least identifying information for the resource generating the resource signal data 114, and an indication of whether the resource signal data 114 has been successfully initialized.

Thereafter, the asynchronous fleet configuration service 102 validates the received resource signal data 114, at block 408. According to one implementation, validation includes determining that the resource generating the resource signal data 114 passes a set of conditional tests. The conditional tests can include any suitable validation test, including validation of origin, validation of account information related to a fleet owner 110, and other suitable validation tests.

In one example, the conditional tests include determining that the resource signal data originates from a resource associated with an existing or valid account with a service provider operating the service provider network 101. The existing or valid account may belong, for example, to the fleet owner 110. The conditional tests can also include determining that the resource signal data 114 originates from a resource associated with an account with sufficient access privileges to the fleet 106 on which the method 306 is being performed.

The conditional tests can also include determining that the resource signal data 114 originates from a resource 104 already existing in the fleet 106. Other conditional tests can include determining that the resource signal data 114 does not originate from a resource 104 being terminated through block 404, that the resource signal data 114 originates from a resource currently being initialized through block 402, and/or that the resource signal data 114 has valid access to the asynchronous API 122 exposed through the asynchronous fleet configuration service 102. Other forms of suitable validation may also be applicable, and are within the scope of this disclosure.

Thereafter, if the resource signal data 114 is not determined to be valid at block 410, the asynchronous fleet configuration service 102 may ignore the data and proceed to receive additional resource signal data at block 406. Additionally, if the resource signal data 114 is valid, the asynchronous fleet configuration service 102 updates the fleet resource signal table 134 by creating a new entry 124 with the validated resource signal data 114, at block 412. The new entry 124 may be appending to the table 134 or otherwise added in any suitable manner.

It is noted that receiving and validating resource signal data 114, and creation of new entries 124 based on validated resource signal data 114, may be continually performed in an iterative manner by the asynchronous fleet configuration service 102.

Thereafter, or while iteratively receiving, validating, and creating as described above, the asynchronous fleet configuration service 102 may asynchronously poll the fleet resource signal table 134 to retrieve previously unprocessed resource signal data 114. For example, unprocessed resource signal data 114 is data that has not been flagged as processed as is described in the following description of blocks 416, 418, 420, 422, 424, and/or 428, below.

Upon retrieving an unprocessed resource signal data 114, the asynchronous fleet configuration service 102 proceeds to update an associated entry 124 to indicate that the resource signal data 114 has been processed, at block 416. For example, the asynchronous fleet configuration service 102 may flip a binary flag indicating a processed/unprocessed state, for the associated entry 124. The asynchronous fleet configuration service 102 may subsequently determine if the retrieved resource signal data 114 indicates that an associated resource has been initiated successfully, at block 418. If the resource has been successfully initiated, the asynchronous fleet configuration service 102 may increment resource counter 120, and determine if the value of successful initializations reflected by the counter are above a threshold, at blocks 420 and 422, respectively.

Generally, the threshold may include any pre-configured or desired threshold. The threshold may include a target number of resources per batch, a total number of resources per match, a minimum number of resources per batch, or any suitable threshold. The threshold may be configured by the fleet owner 110, for example, by declaring at least one value for the threshold in the configuration policy 108.

If the value of successful initializations are above the threshold, the asynchronous fleet configuration service 102 may indicate success of the configuration of an entire batch of resources for a fleet 106, at block 424, and the method 306 may cease at block 426. Alternatively, if the threshold has not been met or surpassed, the asynchronous fleet configuration service may continue to asynchronously poll the fleet resource signal table 134 for unprocessed entries at block 414, and iteratively perform the method 306 as described above. Additionally, if any particular validated resource signal data 114 is determined to not indicate successful initialization of an associated resource at block 418, the asynchronous fleet configuration service 102 may indicate failure of the asynchronous batch configuration at block 428 and cease to continue to process the method 306.

As described above, an asynchronous fleet configuration service, illustrated as service 102, can be implemented that provides functionality for deploying or updating a fleet 106 of resources 104 through the service provider network 101. Alternative implementations of the particular examples described above are also possible, and are within the scope of this disclosure. Furthermore, different operating environments and computing devices may be used to implement some or all of the functionality described herein. Hereinafter, non-limiting examples of possible operating environments and computing devices are described more fully with reference to FIGS. 5-8.

Figure 5:
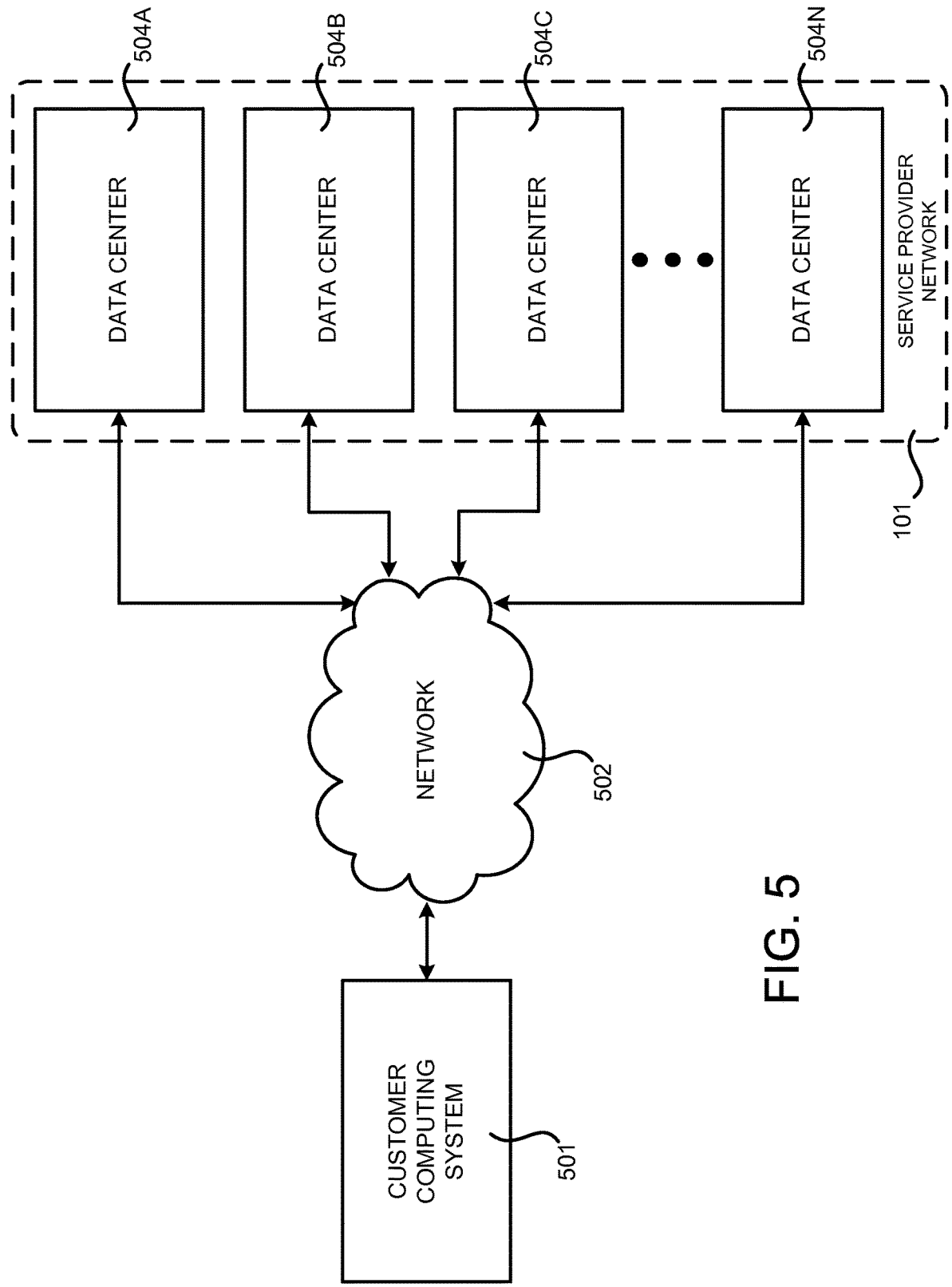
FIG. 5 is a system and network diagram that shows an illustrative operating environment for the various technologies disclosed herein that includes a service provider network that may be configured to implement aspects of the functionality described herein.

FIG. 5 is a system and network diagram that shows one illustrative operating environment for the configurations disclosed herein that includes a service provider network 101 that may be configured to provide an asynchronous fleet configuration service 102 in the manner described above, according to one configuration disclosed herein. As discussed briefly above, the service provider network 101 can provide computing resources that may be instantiated through a computing architecture template 122, on a permanent or an as-needed basis.

The computing resources provided by the service provider network 101 may include various types of computing resources, such as data processing resources, data storage resources, networking resources, data communication resources, and the like. Each type of computing resource may be general-purpose or may be available in a number of specific configurations. For example, and as described briefly above, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 101 might also be configured to provide various network services.

The computing resources provided by the service provider network 101 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating an asynchronous fleet configuration service 102 within the service provider network 101 will be described below with regard to FIG. 6.

The customers and other users of the service provider network 101 may access the computing resources provided by the service provider network 101 over a network 502, such as a wide area network (WAN). For example, and without limitation, a customer computing system 501 might be utilized to access the service provider network 101 by way of the network 502. It should be appreciated that a local-area network (LAN), the Internet, or any other networking topology known in the art that connects the data centers 504 to remote customers, fleet owners, and other users may be utilized. It should also be appreciated that combinations of such networks might also be utilized.

Figure 6:
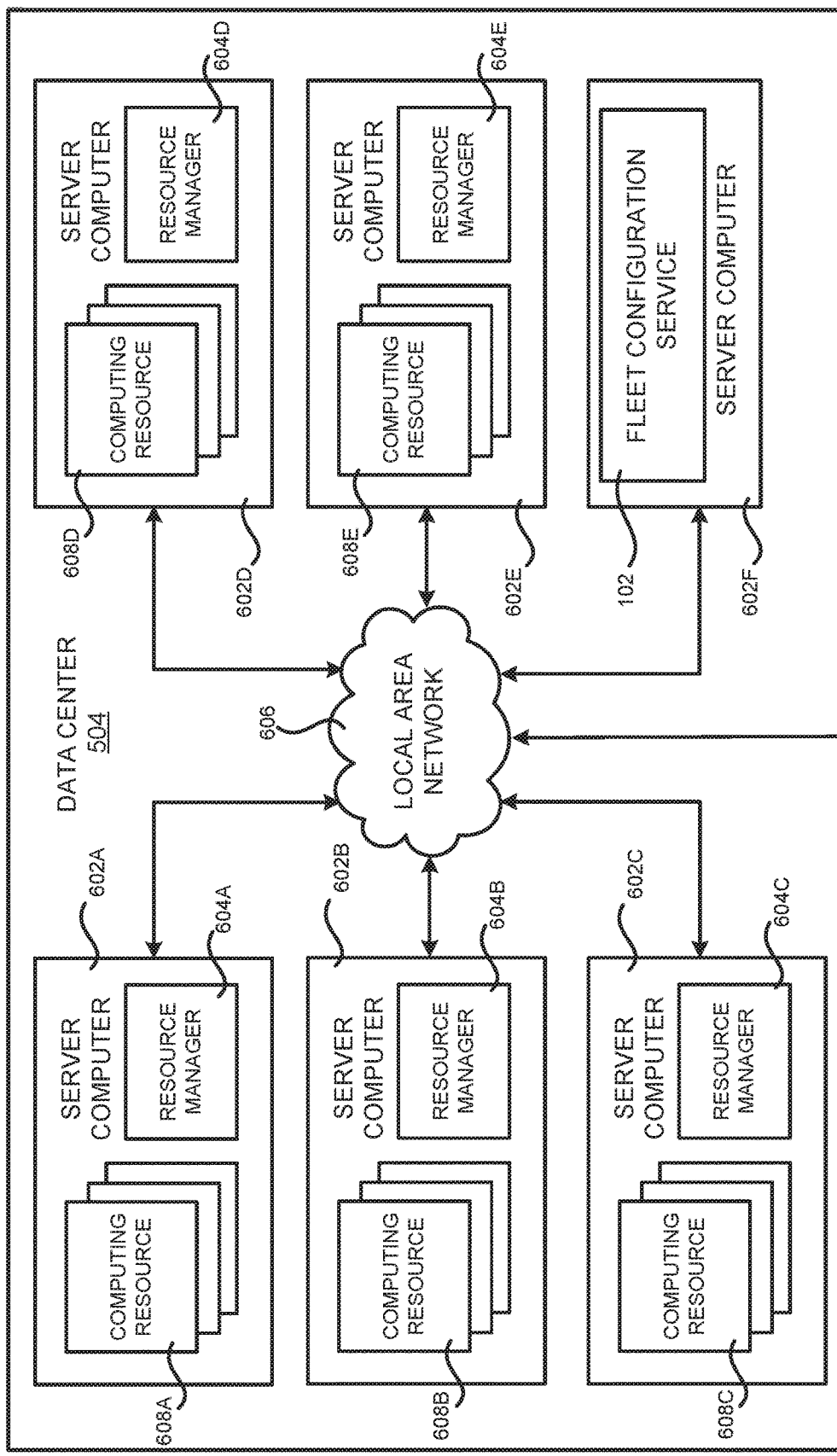
FIG. 6 is a computing system diagram that illustrates a configuration for a data center that may be utilized to implement aspects of the concepts and technologies disclosed herein.

FIG. 6 is a computing system diagram that illustrates one configuration for a data center 504 that implements aspects of the concepts and technologies disclosed herein for implementing an asynchronous fleet configuration service 102, according to one configuration disclosed herein. The example data center 504 shown in FIG. 6 includes several server computers 602A-602F (which may be referred to herein singularly as "a server computer 602" or in the plural as "the server computers 602") for providing computing resources 608A-608E.

The server computers 602 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 602A-602E might also be configured to execute a respective resource manager 604A-604E capable of instantiating and/or managing the computing resources based on a computing architecture template 122. In the case of virtual machine instances, for example, the resource manager 604, such as resource managers 604A-604E in FIG. 6, might be a hypervisor or another type of program configured to enable the execution of multiple virtual machine instances on a single server 602 based on declarations in the computing architecture template 122, for example. Server computers 602 in the data center 504 might also be configured to provide network services and other types of services, some of which are described in detail below with regard to FIG. 7.

The data center 504 shown in FIG. 6 also includes a server computer 602F that may be utilized for executing some or all of the software components described above. For example, and without limitation, the server computer 602F might be configured to execute the asynchronous fleet configuration service 102, which has been described in detail above. The server computer 602F might also be configured to execute other components and/or store data for providing some or all of the functionality described herein.

In the example data center 504 shown in FIG. 6, an appropriate LAN 606 is utilized to interconnect the server computers 602A-602F. The LAN 606 is also connected to the network 502 illustrated in FIG. 5. It should be appreciated that the configuration and network topology illustrated in FIGS. 1 and 5-6 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with respect to FIG. 6 is merely illustrative and that other implementations might be utilized.

Figure 7:
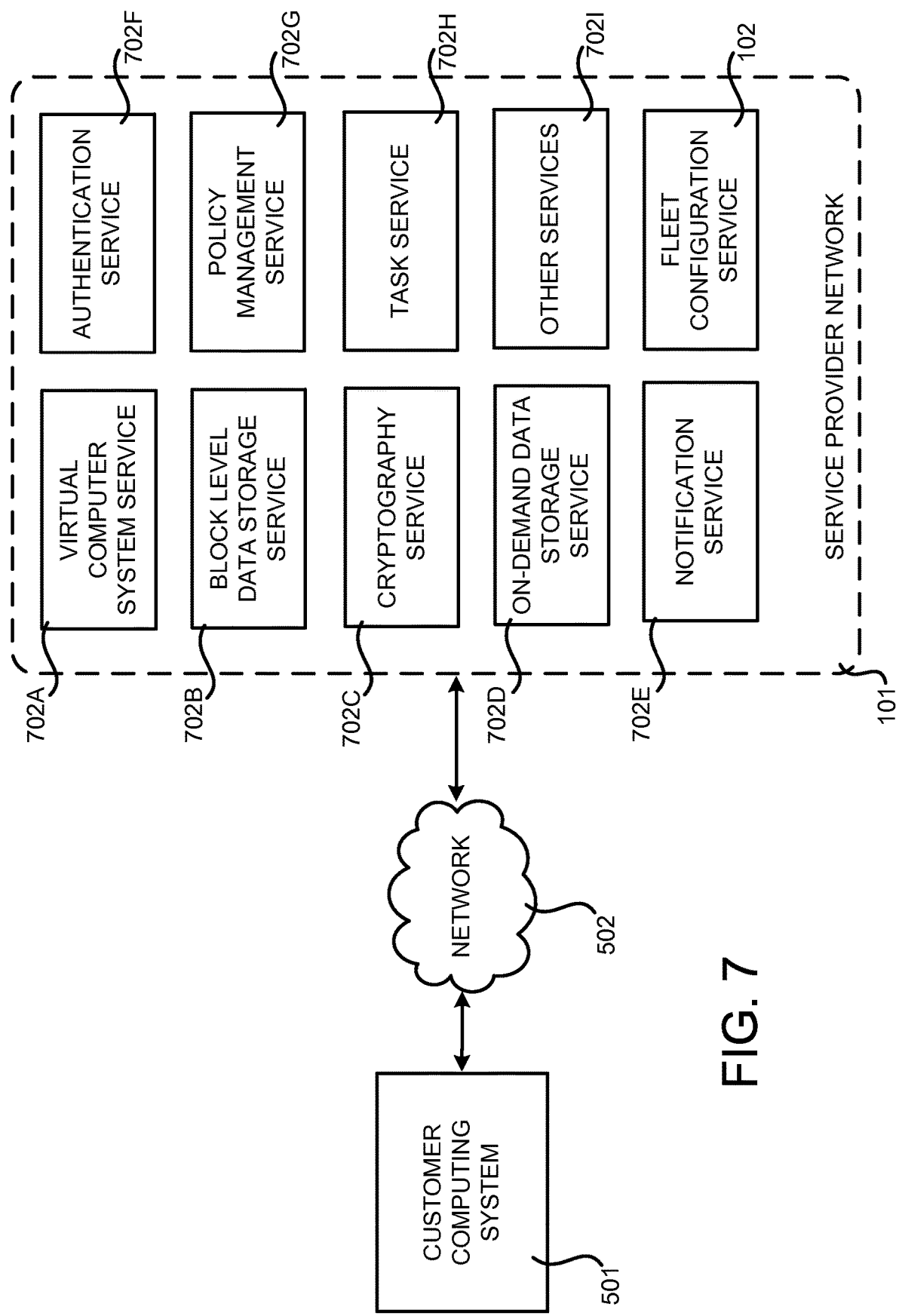
FIG. 7 is a system and network diagram that shows aspects of several services that might be provided by and utilized within a service provider network in one configuration disclosed herein.

FIG. 7 is a system and network diagram that shows aspects of several services 702 that might be provided by and utilized within a service provider network 101 in one configuration disclosed herein. In particular, FIG. 7 shows an example of a customer computing system 102 connected to the service provider network 101 through a network 502 in one example. As discussed briefly above, the service provider network 101 may provide a variety of services 902 to customers of the service provider network 101, including but not limited to, the asynchronous fleet configuration service 102.

It should be appreciated that customers of the service provider network 101 may be an organization that may utilize the services provided by the service provider network 101. Additionally, customers of the service provider network 101 may be individuals that utilize the services provided by the service provider network 101. As shown in FIG. 7, a customer may communicate with the service provider network 101 through a network 502, which may be a communication network, such as the Internet, an intranet or an Internet service provider (ISP) network. Communications from the customer computing system 501 to the service provider network 101 may cause the services provided by the service provider network 101 to operate in accordance with configurations described or variations thereof.

As discussed briefly above, the service provider network 101 may provide various types of network services to its customers. The services provided by the service provider network 101, in this example, include a virtual computer system service 702A, a block-level data storage service 702B, a cryptography service 702C, an on-demand data storage service 702D, a notification service 702E, an authentication service 702F, a policy management service 702G, a task service 702H and, potentially, other services 702I. The service provider network 101 may also provide the asynchronous fleet configuration service 102 for use internally and by external customers.

It is noted that not all configurations described include the services 702A-702I described with reference to FIG. 7 and additional services may be provided in addition to or as an alternative to services explicitly described. Each of the services 702A-702I may include web service interfaces that enable a caller to submit appropriately configured API calls to the various services through web service requests. In addition, each of the services may include service interfaces that enable the services to access each other (e.g., to enable a virtual computer system of the virtual computer system service 702A, to store data in or retrieve data from the on-demand data storage service 702D, and/or to access block-level data storage devices provided by the block level data storage service 702B). Additional details regarding the services 702A-702H shown in FIG. 7 will now be provided.

The virtual computer system service 702A may be a collection of computing resources configured to instantiate virtual machine instances. For example, a customer of the service provider network 101 may interact with the virtual computer system service 702A (via appropriately configured and authenticated API calls) to provision and operate virtual computer systems that are instantiated on physical computing devices hosted and operated by the service provider network 101. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the virtual computer system service 702A is shown in FIG. 7, any other computer system or computer system service may be utilized in the service provider network 101, such as a computer system or computer system service that does not employ virtualization or instantiation and instead provisions computing resources on dedicated or shared computers/ servers and/or other physical devices.

The block-level data storage service 702B may comprise computing resources that collectively operate to store data using block-level storage devices (and/or virtualizations thereof). The block-level storage devices of the block-level data storage service 702B may, for instance, be operationally attached to virtual computer systems provided by the virtual computer system service 702A to serve as logical units (e.g., virtual drives) for the computer systems. A block-level storage device may enable the persistent storage of data used/generated by a corresponding virtual computer system where the virtual computer system service 702A may only provide ephemeral data storage.

The service provider network 101 may also include a cryptography service 702C. The cryptography service 702C may utilize storage services of the service provider network 101 to store encryption keys in encrypted form, whereby the keys may be usable to decrypt customer keys accessible only to particular devices of the cryptography service 702C. The cryptography service 702C might also provide other types of functionality not specifically mentioned herein.

The service provider network 101 further includes an on-demand data storage service 702D. The on-demand data storage service 702D may be a collection of computing resources configured to synchronously process requests to store and/or access data. The on-demand data storage service 702D may operate using computing resources (e.g., databases) that enable the on-demand data storage service 702D to locate and retrieve data quickly, so as to allow data to be provided in responses to requests for the data. For example, the on-demand data storage service 702D may maintain stored data in a manner such that, when a request for a data object is retrieved, the data object can be provided (or streaming of the data object can be initiated) in a response to the request. As noted, data stored in the on-demand data storage service 702D may be organized into data objects. The data objects may have arbitrary sizes except, perhaps, for certain constraints on size. Thus, the on-demand data storage service 702D may store numerous data objects of varying sizes. The on-demand data storage service 702D may operate as a key value store that associates data objects with identifiers of the data objects which may be used to retrieve or perform other operations in connection with the data objects stored by the on-demand data storage service 702D.

The service provider network 101 might also provide a notification service 702E in some configurations. The notification service 702E may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 702E may provide notifications to clients using a "push" mechanism without the need to periodically check or "poll" for new information and updates. The notification service 702E may further be used for various purposes such as monitoring applications executing in the virtual computer system service 702A, workflow systems, time-sensitive information updates, mobile applications, and many others.

As illustrated in FIG. 7, the service provider network 101, in various configurations, includes an authentication service 702F and a policy management service 702G. The authentication service 702F, in one example, is a computer system (i.e., collection of computing resources) configured to perform operations involved in authentication of users of the customer. For instance, one of the services 702A-702E and 702G-702I may provide information from a user to the authentication service 702F to receive information in return that indicates whether or not the requests submitted by the user are authentic.

The policy management service 702G, in one example, is a computer system configured to manage policies on behalf of customers or internal users of the service provider network 101. The policy management service 702G may include an interface that enables customers to submit requests related to the management of policy. Such requests may, for instance, be requests to add, delete, change or otherwise modify policy for a customer or for other administrative actions, such as providing an inventory of existing policies and the like.

The service provider network 101, in various configurations, is also configured with a task service 702H. The task service 702H is configured to receive a task package and to enable executing tasks as dictated by the task package. The task service 702H may be configured to use any resource of the service provider network 101, such as instantiated virtual machines or virtual hosts, for executing the task. The task service 702H may configure the instantiated virtual machines or virtual hosts to operate using a selected operating system and/or a selected execution application in accordance with specified requirements.

The service provider network 101 may additionally maintain other services 702I based, at least in part, on the needs of its customers. For instance, the service provider network 101 may maintain a database service is some configurations.

A database service may be a collection of computing resources that collectively operate to create, maintain, and allow queries to be performed on databases stored within the service provider network 101. For example, a customer of the service provider network 101 may operate and manage a database from the database service by utilizing appropriately configured API calls. This, in turn, may allow the customer to maintain and potentially scale the operations in the database. Other services include object-level archival data storage services, services that manage and/or monitor other services. The service provider network 101 might also be configured with other services not specifically mentioned herein.

Figure 8:
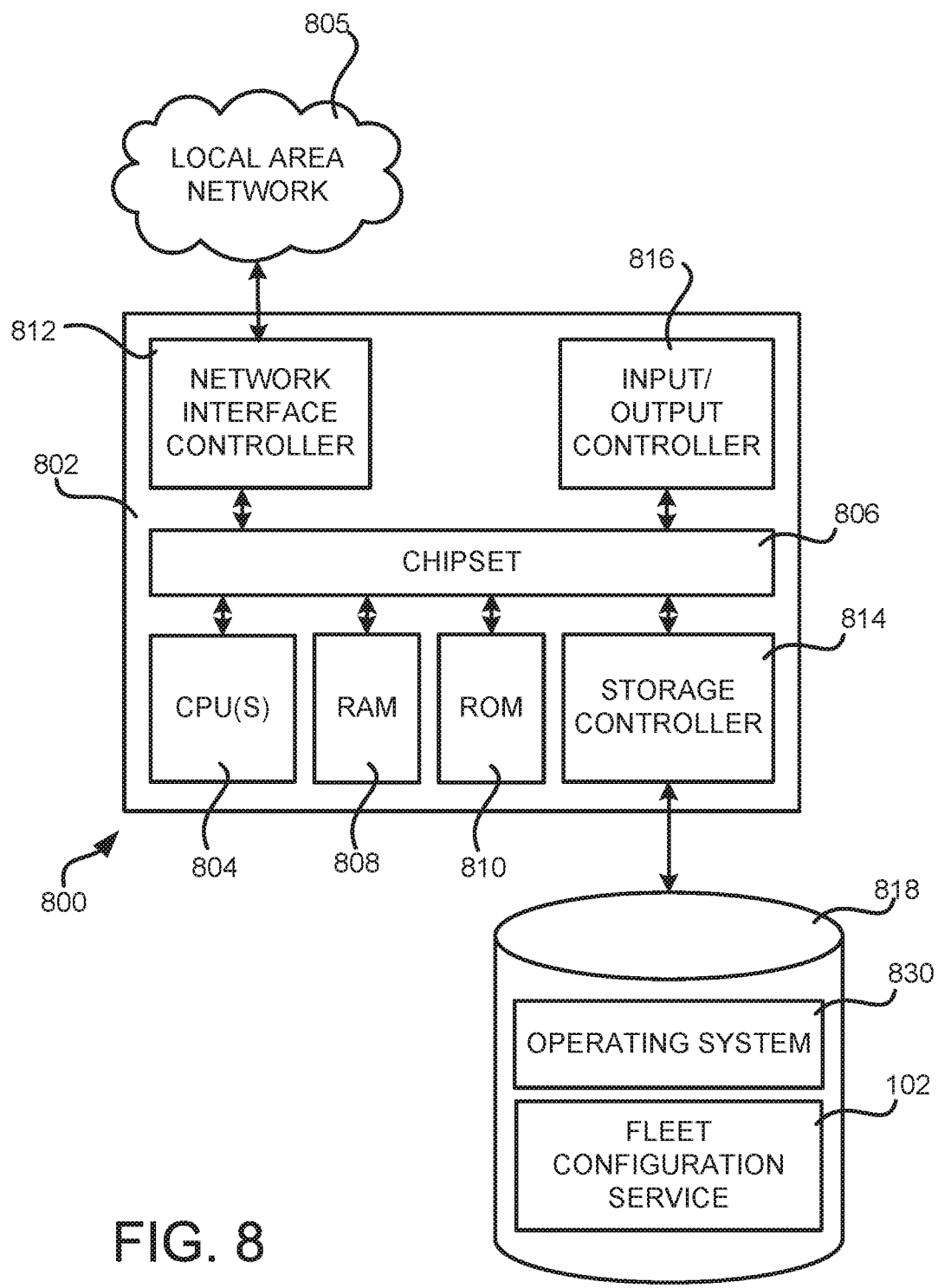
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components for implementing the asynchronous fleet configuration service 102 in the manner described above. The computer architecture shown in FIG. 8 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the asynchronous fleet configuration service 102 and/or related functionality. The computer architecture shown in FIG. 8 might also be utilized to implement a customer computing system 501 or any other of the computing systems described herein.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the local area network 805. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800, such as the asynchronous fleet configuration service 102, and/or any of the other software components and data described above. The mass storage device 818 might also store other programs and data not specifically identified herein.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various routines described above with regard to FIGS. 3-4, or implement the configuration polity further described above with regard to FIG. 2. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing an asynchronous fleet configuration service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method for providing an asynchronous fleet configuration service in a service provider network, the method comprising performing computer-implemented operations for:
 exposing an asynchronous signaling application programming interface (API) to a fleet of resources, the asynchronous signaling API facilitating asynchronous updates related to statuses of resources of the fleet of resources;
 receiving a configuration policy associated with the fleet of resources deployed through a service provider network, the configuration policy describing a creation policy for deploying resources in the fleet of resources and an update policy for updating resources of the fleet of resources, wherein the configuration policy identifies a minimum quantity of the resources required to be deployed or updated successfully as a threshold number of a first batch of the resources;
 updating or deploying the resources of the fleet of resources according to the configuration policy, comprising:
 receiving, via the asynchronous signaling API, signals provided asynchronously by one or more resources in the first batch of the resources indicating statuses of the update or deployment for the one or more resources;
 determining that the signals pass one or more conditional tests as validation;
 responsive to the validation, creating entries in a database corresponding to the statuses of the update or deployment for the one or more resources;
 determining from the entries in the database that the threshold number of the first batch of the resources have updated or deployed successfully; and
 responsive to determining that the threshold number of the first batch of the resources have updated or deployed successfully, beginning to update or deploy a second batch of the resources of the fleet according to the configuration policy.

2. The computer-implemented method of claim 1, wherein the one or more conditional tests include determining that the signals originate from the one or more resources.

3. The computer-implemented method of claim 2, further comprising:
 asynchronously polling the database to retrieve unprocessed entries; and
 updating the database to indicate the retrieved unprocessed entries have been processed.

4. The computer-implemented method of claim 1, wherein the signals include identifying information uniquely identifying an associated resource and a customer account from the service provider network.

5. The computer-implemented method of claim 4, further comprising:
 performing the one or more conditional tests based on the identifying information.

6. The computer-implemented method of claim 1, further comprising:
 determining that the threshold number of the first batch of the resources have not updated or deployed successfully; and
 responsive to determining that the first batch of the resources have not updated or deployed successfully, indicating failure of an update of the first batch of the resources.

7. The computer-implemented method of claim 6, further comprising, responsive to the failure of the update to the first batch of the resources, attempting to roll-back the update of the first batch of the resources.

8. A non-transitory computer-readable storage medium having computer-executable instructions stored thereupon which, when executed by a computer, cause the computer to:
 receive a configuration policy associated with a fleet of resources deployed through a service provider network, the configuration policy describing a creation policy for deploying resources in the fleet of resources and an update policy for updating resources in the fleet of resources, wherein the configuration policy identifies a minimum quantity of the resources required to be deployed or updated successfully as a threshold number of a first batch of the resources;
 determine that at least some resources in the fleet of resources are to be updated or deployed based at least in part on the configuration policy;
 begin to update or deploy the first batch of the resources according to the configuration policy;
 expose an asynchronous signaling application programming interface (API) to the first batch of the resources;
 receive, via the asynchronous signaling API, signals provided asynchronously by one or more resources in the first batch of the resources indicating statuses of the update or the deployment for the one or more resources;
 determine that the signals pass one or more conditional tests as validation;
 responsive to the validation, create entries in a data store corresponding to the statuses of the update or the deployment for the one or more resources;
 determine from the entries in the data store that the threshold number of the first batch of the resources have updated or deployed successfully; and
 responsive to determining that the threshold number of the first batch of the resources have updated or deployed successfully, begin to update or deploy a second batch of the resources according to the configuration policy.

9. The non-transitory computer-readable storage medium of claim 8, wherein, in response to the update policy indicating support for asynchronous fleet configuration, the one or more resources invoke a helper script for originating the signals.

10. The non-transitory computer-readable storage medium of claim 8, wherein the one or more conditional tests include determining that the signals originate from the one or more resources.

11. The non-transitory computer-readable storage medium of claim 8, further configured to cause the computer to:
 determine that the threshold number of the first batch of the resources have not updated or deployed successfully; and
 responsive to determining that the first batch of the resources have not updated or deployed successfully, indicate failure of an update of the first batch of the resources.

12. The non-transitory computer-readable storage medium of claim 11, further configured to cause the computer, responsive to the failure of the update to the first batch of the resources, to attempt to roll-back the update of the first batch of the resources.

13. The non-transitory computer-readable storage medium of claim 8, wherein the begin to update or deploy a second batch of the resources proceeds while not being dependent upon a time delay.

14. An apparatus comprising:

a processor; and a non-transitory computer-readable storage medium having instructions stored thereupon which are executable by the processor and which, when executed, cause the apparatus to execute an asynchronous fleet configuration service configured to:

receive a configuration policy associated with a fleet of resources, the configuration policy describing an update policy for updating resources in the fleet of resources, wherein the configuration policy identifies a minimum quantity of the resources required to be updated successfully as a threshold number of a first batch of the resources;

determine that some resources in the fleet of resources are to be updated based at least in part on the configuration policy;

begin to update the first batch of the resources according to the configuration policy;

expose an asynchronous signaling application programming interface (API) to the first batch of the resources;

receive, via the asynchronous signaling API, signals provided asynchronously by one or more resources in the first batch of the resources indicating statuses of the one or more resources;

determine that the signals pass one or more conditional tests as validation;

responsive to the validation, create entries in a data store corresponding to the statuses of the update for the one or more resources;

determine from the entries in the data store that the threshold number of the first batch of the resources have updated successfully; and responsive to determining that the threshold number of the first batch of the resources have updated successfully, begin to update a second batch of the resources according to the configuration policy.

15. The apparatus of claim 14, wherein the configuration policy further describes a creation policy for deploying new resources in the fleet of resources.

16. The apparatus of claim 15, wherein, in response to the update policy indicating support for asynchronous fleet configuration, the one or more resources invoke a helper script for originating the signals and wherein the asynchronous fleet configuration service is further configured to:

determine that a new resource is to be deployed based on the configuration policy;

begin to initialize the new resource according to the configuration policy; and receive an asynchronous update related to an initialization status of the new resource.

17. The apparatus of claim 14, wherein the one or more conditional tests include determining that the signals originate from the one or more resources.

18. The apparatus of claim 14, wherein the asynchronous fleet configuration service is further configured to:

determine that the signals indicate that the first batch of the resources have not updated successfully; and responsive to determining that the first batch of the resources have not updated successfully, indicating failure of an update of the first batch of the resources.

19. The apparatus of claim 18, wherein the asynchronous fleet configuration service is further configured to, responsive to failure of the update to the first batch of the resources, attempt to roll-back the update of the first batch of the resources.

20. The apparatus of claim 14, wherein the begin to update a second batch of the resources proceeds while not being dependent upon a time delay.

\* \* \* \* \*